March 24, 1970  L. DOYEN ET AL  3,502,521

METHOD OF PRODUCING PLASTIC CONTAINERS

Filed March 14, 1966

Leon Doyen
Louis Doyen
INVENTORS.

BY  *Karl F. Ross*

ATTORNEY

United States Patent Office 3,502,521
Patented Mar. 24, 1970

---

3,502,521
METHOD OF PRODUCING PLASTIC CONTAINERS
Louis Doyen and Leon Doyen, both of 79 Rue de
Bourgogne, Lyon, Rhone, France
Continuation-in-part of application Ser. No. 322,887,
Nov. 12, 1963. This application Mar. 14, 1966, Ser.
No. 534,107
Claims priority, application France, Aug. 26, 1965,
45,916
Int. Cl. B29h 7/04; B29c 27/02
U.S. Cl. 156—69    1 Claim

ABSTRACT OF THE DISCLOSURE

A method of making containers of plastic material in which a pair of thermoplastic sheets are disposed one above the other and are joined at their base while being thermally welded together along flat seams on opposite longitudinal sides from the base toward an upper end of the assembly with convergence of these seams. One of these seams may be of progressively increasing width toward the top to form a handle.

---

This application is a continuation-in-part of our application Ser. No. 322,887 filed Nov. 12, 1963, now U.S. Patent No. 3,380,646.

Our invention has for its object a container made of plastic material and a method for producing same. In such containers, the sheaths or sheets of plastic material forming the container are welded (i.e. thermally fused) transversely so as to define the outline of the container along two lines converging towards each other in the area which is to form the upper section of the container, which section assumes the shape of a neck. A container thus made does not bend during the pouring out of the liquid carried by it and consequently the dispensing of said liquid may be easily carried out with one hand.

According to a further feature of our invention, one of the above-mentioned transverse welds, whether rectilinear or otherwise, is given a V-shaped cross-section so that the container is provided laterally with a fin serving as a handle.

In the case where the two transverse welds are rectilinear and one of them extends outwardly to form a handle, the weld closing the upper opening of the container slops advantageously so as to form a dispensing spout on the side opposed to the above-mentioned handle.

Figure 1:
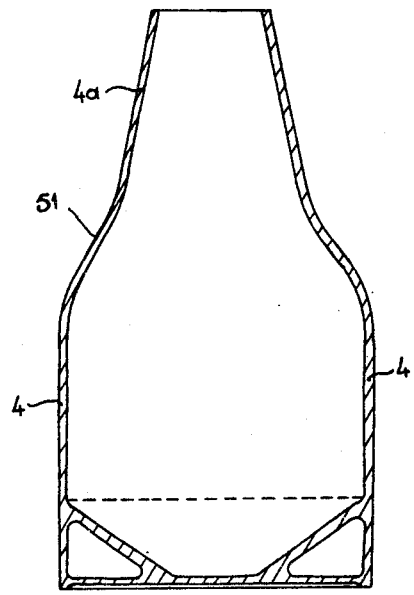
Figure 2:
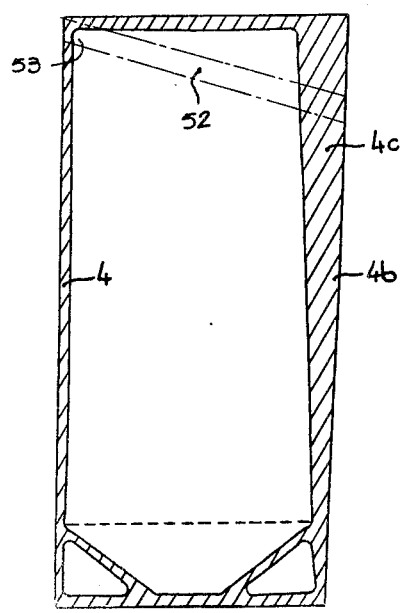

The invention is described in greater detail with reference to the accompanying drawing, in which:

FIG. 1 is a section through a container of thermoplastic material according to the invention; and FIG. 2 is a section through another embodiment of the invention.

The container outlines are defined laterally by welded sections extending transversely with reference to the sheet serving for their manufacture.

In the first embodiment of our invention illustrated in FIG. 1, the welded sections 4 are curved inwardly at 51 so that their free ends 4a are closer to each other in the upper area of the container and form thus a neck for the container.

The fact that said container is provided with the neck leads to the advantage of providing it with a sufficient rigidity to prevent it from bending when the user pours out the liquid it carries, which allows said user to transport the container by one hand only.

By reason of their narrowness the necks may, in the making of the containers, be obtained by cutting the containers in head-to-tail relationship whereby loss of material is reduced substantially to zero.

FIG. 2 illustrates a second embodiment in which one of the transverse welded sections 4 is provided normally along a vertical line while the other welded section 4b is broader and the inside of the outline of a theoretically cylindrical container increases in thickness from the bottom to the top so that it appears to have a V-shaped cross-section. Said welded section 4b forms a handle 4c which aids in the handling of the container.

As illustrated in FIG. 2 in dot and dash lines, it is possible to provide a closing of the upper end of the container by a welded section 52 sloping downwardly from the welded section 4 towards the handle 4c.

The opening of the container is effected by making a cut off along a bevel line so as to form a dispensing spout diametrically opposite to the handle. The use of such a container is made easier thereby since the fin forming the handle 4c acts also as a strengthening and reinforcing part.

Obviously, the arrangements according to FIG. 2 may be provided for the embodiment illustrated in FIG. 1, to wit the latter may include a handle and/or an upper sloping welded section.

What we claim is:

1. A method of making a container comprising the steps of juxtaposing two thermoplastic sheets and interconnecting them at a base; thermally welding said sheets together along a pair of transversely spaced longitudinally extending weld means converging from said base toward an upper end of the container, whereby said weld seams form laterally extending webs along the exterior of the container upon opening thereof, the weld being formed along the rear co-operating edges as an upwardly flaring outwardly projecting handle-shaped weld the inner surface of which converges towards the front edge of the container; and welding a cover over the upper edge of the container along a sloping line rising towards the front edge and leaving a free space between it and said front edge.

References Cited

UNITED STATES PATENTS

| | | | |
|---|---|---|---|
| 3,192,095 | 6/1965 | Doyen et al. | 156—510 |
| 3,380,646 | 4/1968 | Doyen et al. | 229—57 |
| 3,388,021 | 6/1968 | Johnson | 156—69 X |
| 3,402,873 | 9/1968 | Lauterbach | 156—69 X |
| 1,970,802 | 8/1934 | Johnson | 156—69 X |
| 2,833,683 | 5/1958 | Quandt | 156—69 |
| 2,985,954 | 5/1961 | Jones et al. | 29—470 |
| 3,242,029 | 3/1966 | Deans | 156—73 X |
| 3,244,574 | 4/1966 | Decker et al. | 156—73 X |
| 3,383,256 | 5/1968 | Carbone | 156—69 |

FOREIGN PATENTS 1,246,309  10/1960  France.

HAROLD ANSHER, Primary Examiner

U.S. Cl. X.R.

156—251, 292, 306